US008151217B2

(12) United States Patent
Lin

(10) Patent No.: US 8,151,217 B2
(45) Date of Patent: Apr. 3, 2012

(54) SYSTEM AND METHOD FOR DYNAMICALLY DISPLAYING APPLICATION SHORTCUT ICONS OF AN ELECTRONIC DEVICE

(75) Inventor: Sheng-Feng Lin, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 383 days.

(21) Appl. No.: 12/510,169

(22) Filed: Jul. 27, 2009

(65) Prior Publication Data

US 2010/0175025 A1 Jul. 8, 2010

(30) Foreign Application Priority Data

Jan. 5, 2009 (CN) .......................... 2009 1 0300056

(51) Int. Cl.
*G06F 3/048* (2006.01)
*G06F 3/00* (2006.01)

(52) U.S. Cl. ........ 715/847; 715/810; 715/821; 715/835; 715/846; 715/977

(58) Field of Classification Search .................. 715/811, 715/810, 821, 835, 846, 847, 977
See application file for complete search history.

(56) References Cited

U.S. PATENT DOCUMENTS

| | | | | | |
|---|---|---|---|---|---|
| 5,125,071 A | * | 6/1992 | Ozeki | ............................ | 715/811 |
| 5,420,975 A | * | 5/1995 | Blades et al. | .................. | 715/811 |
| 5,600,776 A | * | 2/1997 | Johnson et al. | ................ | 715/733 |
| 5,852,440 A | * | 12/1998 | Grossman et al. | ............. | 715/811 |
| 6,052,676 A | * | 4/2000 | Hekmatpour | .................... | 706/11 |
| 6,148,294 A | * | 11/2000 | Beyda et al. | ........................... | 1/1 |
| 6,583,797 B1 | * | 6/2003 | Roth | ............................. | 715/810 |
| 6,600,498 B1 | * | 7/2003 | Chow | ............................ | 715/769 |
| 6,791,586 B2 | * | 9/2004 | Baker | ............................ | 715/811 |
| 6,900,835 B2 | * | 5/2005 | Cazier et al. | ................ | 348/231.2 |
| 6,941,337 B2 | * | 9/2005 | Casais | ........................... | 709/202 |
| 7,062,299 B2 | * | 6/2006 | Choi | ................................ | 455/566 |
| 7,237,240 B1 | * | 6/2007 | Chen et al. | ..................... | 718/100 |
| 7,322,012 B2 | * | 1/2008 | Ishii | ............................... | 715/811 |
| 7,543,244 B2 | * | 6/2009 | Matthews et al. | ............. | 715/811 |
| 7,614,004 B2 | * | 11/2009 | Milic-Frayling et al. | ...... | 715/762 |
| 7,660,815 B1 | * | 2/2010 | Scofield et al. | ......... | 707/999.102 |
| 7,865,841 B2 | * | 1/2011 | Morikawa | ...................... | 715/811 |
| 7,895,530 B2 | * | 2/2011 | Leavitt et al. | .................. | 715/810 |
| 8,037,421 B2 | * | 10/2011 | Scott et al. | ..................... | 715/811 |
| 2002/0160817 A1 | * | 10/2002 | Salmimaa et al. | ............. | 455/566 |
| 2003/0098892 A1 | * | 5/2003 | Hiipakka | ...................... | 345/846 |
| 2005/0054381 A1 | * | 3/2005 | Lee et al. | ...................... | 455/557 |
| 2007/0033275 A1 | * | 2/2007 | Toivonen et al. | ............. | 709/224 |
| 2007/0162298 A1 | * | 7/2007 | Melton et al. | ..................... | 705/1 |
| 2009/0024946 A1 | * | 1/2009 | Gotz | .............................. | 715/769 |

FOREIGN PATENT DOCUMENTS

| | | |
|---|---|---|
| CN | 101078984 | 11/2007 |
| CN | 101105799 | 1/2008 |

* cited by examiner

*Primary Examiner* — Steven B Theriault
(74) *Attorney, Agent, or Firm* — Altis Law Group, Inc.

(57) ABSTRACT

A method for dynamically displaying application shortcut icons of an electronic device constructs a dependency relation graph according to applications whose invoked frequency has reached a predetermined frequency value, and further according to browsing paths whose count has reached a predetermined dependency rule. The method further computes a weight value of each node in the dependency relation graph for ranking the applications to display application shortcut icons of the applications on the electronic device according to the rank.

17 Claims, 8 Drawing Sheets

$$PR(P_i) = \frac{(d)}{n} + (1-d) \times \sum_{l_{j,i} \in E} PR(P_j) / Out\deg ree(P_j) =$$

$$\frac{(d)}{n} + (1-d) \times \left\{ \frac{PR(P_1)}{Out\deg ree(P_1)} + ... + \frac{PR(P_j)}{Out\deg ree(P_j)} \right\}$$

FIG. 8

SYSTEM AND METHOD FOR DYNAMICALLY DISPLAYING APPLICATION SHORTCUT ICONS OF AN ELECTRONIC DEVICE

BACKGROUND

1. Technical Field

Embodiments of the present disclosure generally relate to systems and methods for tracking and recording data, and more particularly to a system and method for dynamically displaying application shortcut icons of an electronic device by tracking and recording operations on the electronic device.

2. Description of Related Art

A smart phone is a mobile phone offering advanced capabilities. Smart phones may be installed with applications offering different functionalities.

Navigation of applications in a smart phone may prove inconvenient and tiring if the smart phone comprises many applications. FIG. 1 illustrates an example of a software system tree structure of a smart phone. According to FIG. 1, if a user wants to use an application "App 11," the user needs to firstly open the boot directory, select and open a sub-directory "Dir 1," and then select and open a sub-directory "Dir 4" to use the application "App 11." The above longsome selection and opening brings the user great inconvenience.

Conventionally, for overcoming the above disadvantage, two methods are often used. One such method is to preset shortcut keys for the applications of the software system using a keypad of the smart phone. Another method is to preset application shortcut icons for the applications of the software system on a screen of the smart phone.

However, the above two methods are faulty because it may be difficult for users to remember all the shortcut keys, and a display size of the electronic device limits how many application shortcut icons can be displayed on a display of the electronic device.

BRIEF DESCRIPTION OF THE DRAWINGS

FIG. 8 illustrates an example of an PageRank algorithm.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, a word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 2:
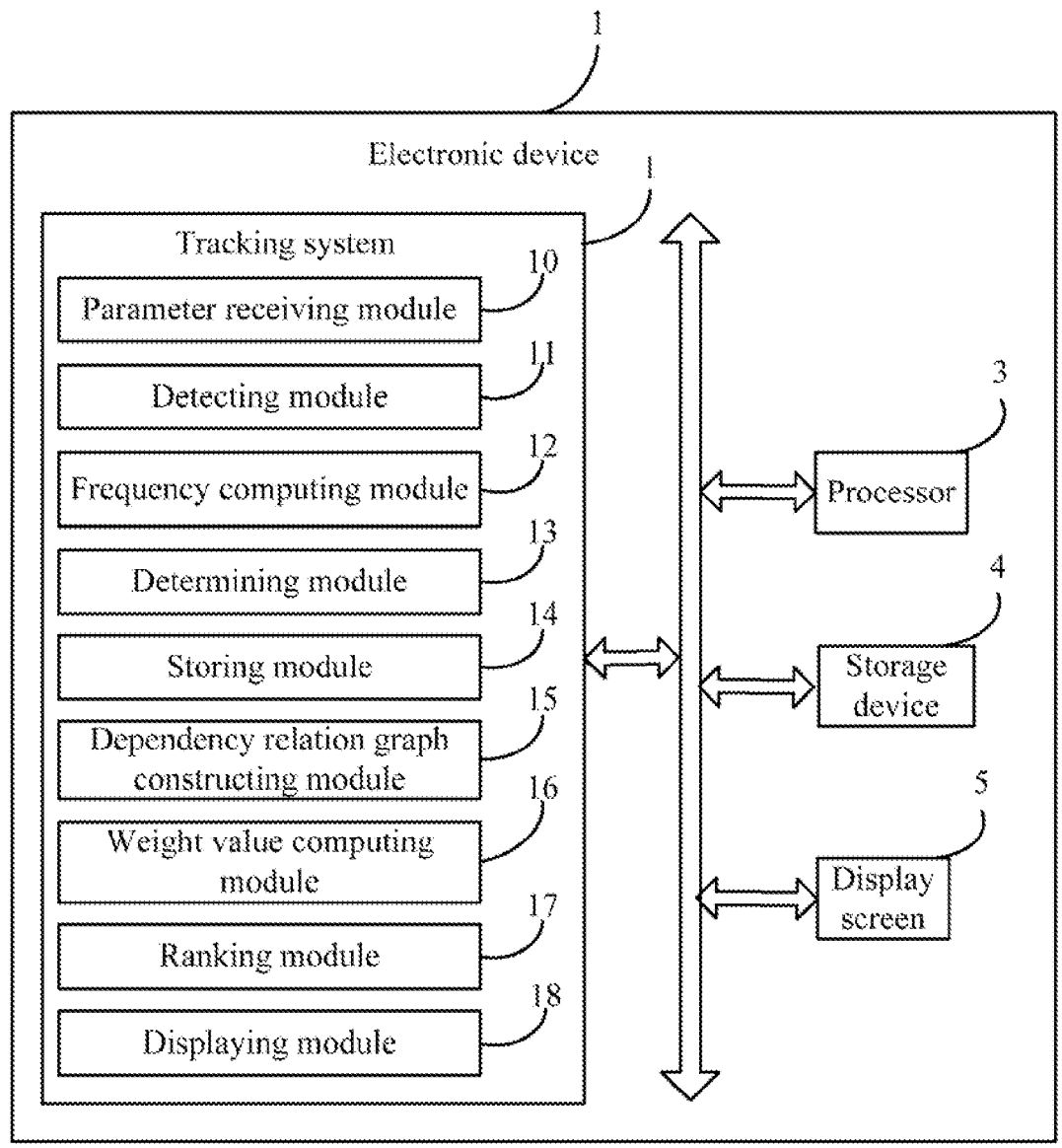
FIG. 2 is a block diagram of one embodiment of a system for dynamically displaying application shortcut icons of an electronic device.

FIG. 2 is a block diagram of one embodiment of a tracking system 1. The tracking system 1 is included in an electronic device 100. The tracking system 1 can dynamically display application shortcut icons of the electronic device 100 by tracking operations on the electronic device 100. It may be understood that, the electronic device 100 is installed with a plurality of applications. In one embodiment, the electronic device 100 may be a mobile phone, a computer, a personal digital assistant (PDA), for example.

The tracking system 1 may include a parameter receiving module 10, a detecting module 11, a frequency computing module 12, a determining module 13, a storing module 14, a dependency relation graph constructing module 15, a weight value computing module 16, a ranking module 17, and a displaying module 18.

At least one processor 3, a storage device 4, and a display screen 5, in the electronic device 100, are in data communication with the tracking system 1 via one or more standards-based bus system. The processor 3 may be used to execute one or more computerized codes of the modules 10-18, to dynamically display application shortcut icons of the applications that are frequently used. The storage device 4 can be used to store data of the operations on the electronic device 100 for picking up the applications that are frequently used. In one embodiment, the storage device 4 may comprise one or more hard disk drives, optical drive, networked drive, or some combination of various digital storage systems. The display screen 5 may be used to display a plurality of application shortcut icons of the electronic device 100.

Figure 1:
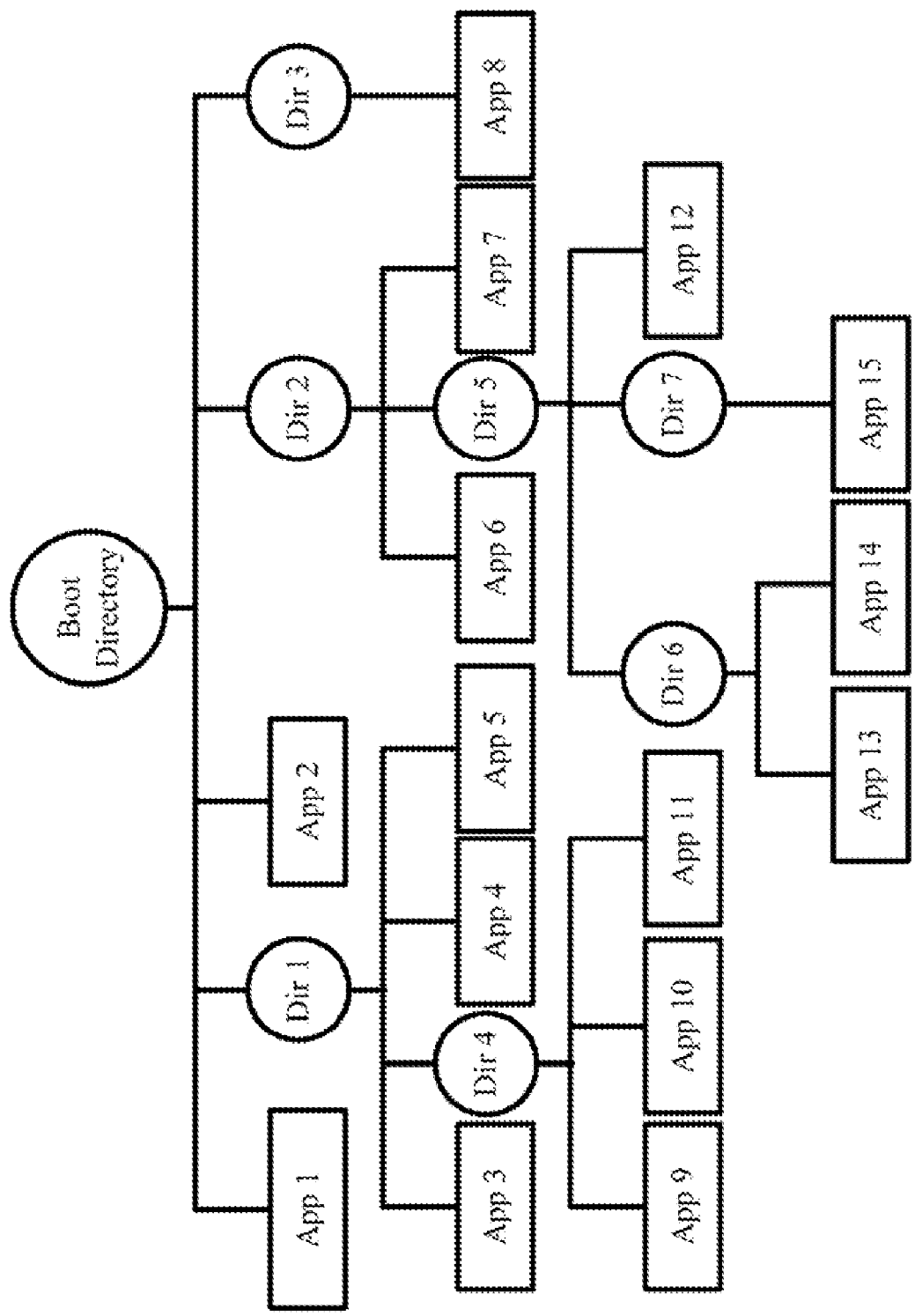
FIG. 1 illustrates an example of a software system tree structure.

The parameter receiving module 10 is operable to receive a predetermined frequency value and a dependency rule. In one embodiment, the frequency value and the dependency rule may be inputted by a user. The frequency value is a count that how many times an application has been invoked within a predetermined time interval. It may be understood that, the frequency value indicates operation habits of the user. If a count that an application has been executed in the predetermined time interval is equal to or more than the predetermined frequency value, the application is considered as a frequently used application of the user. The dependency rule is a count of a taken browsing path to an application. Referring to FIG. 1, in one example, if after using the application "App 1," the user returns to "Boot directory," then selects the sub-directory "Dir 2" to use the application "App 6." In this example, a taken browsing path to the application "App 6" is from "App 1." It may be understood that, if the count of the browsing path is equal to or more than the dependency rule, it means that the application "App 6" and the application "App 1" are relative.

The detecting module 11 is operable to detect an application currently invoked by the electronic device 100, identify a browsing path to the currently invoked application, and store the browsing path into the storage device 4.

The frequency computing module 12 is operable to access an invoked frequency of the currently invoked application from the storage device 4, update the invoked frequency, and save the updated invoked frequency in the storage device 4. In one embodiment, the invoked frequency of an application is incremented by 1 after every time the application is invoked.

The determining module 13 is operable to determine whether the updated invoked frequency of the currently invoked application is equal to or more than the predetermined frequency value for determining whether the currently invoked application is one of frequently used applications of the user. The determining module 13 is further operable to determine whether the count of the browsing path to the currently invoked application is equal to or more than the dependency rule for tracking operations on the electronic device 100.

The storing module 14 is operable to store an identifier of the currently invoked application into a queue of the storage device 4, if the updated invoked frequency of the currently invoked application is equal to or more than the predetermined frequency value. In one embodiment, the queue stores identifiers of all the applications frequently used by the user.

The dependency relation graph constructing module 15 is operable to construct a first dependency relation graph, if the count of the browsing path to the currently invoked application is equal to or more than the dependency rule. It may be understood that, the dependency relation graph can be used to track operations on the electronic device 100. In one embodiment, the first dependency relation graph includes all the applications whose identifiers are in the queue.

Figure 3:
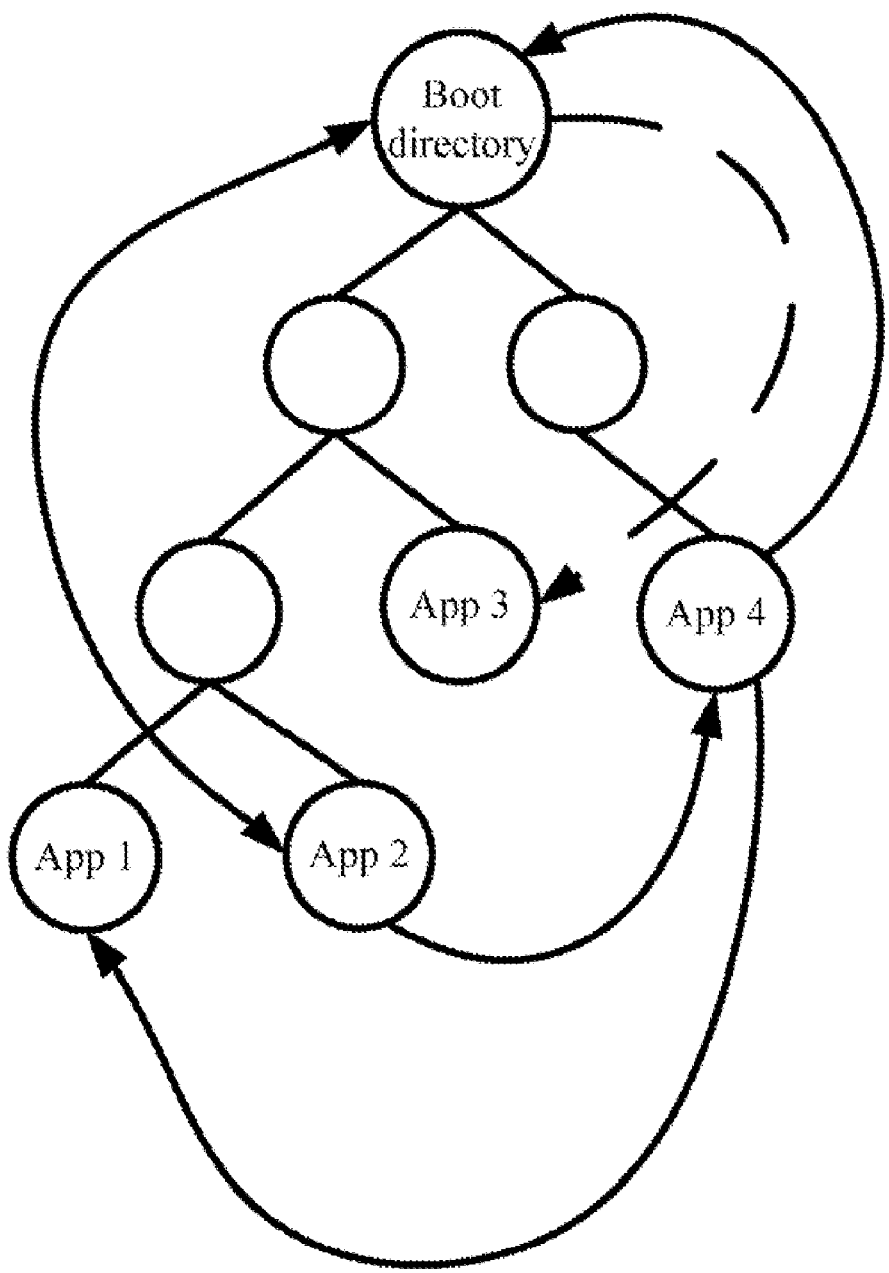
FIG. 3 and FIG. 4 respectively illustrates an example of a first dependency relation graph.
Figure 4:
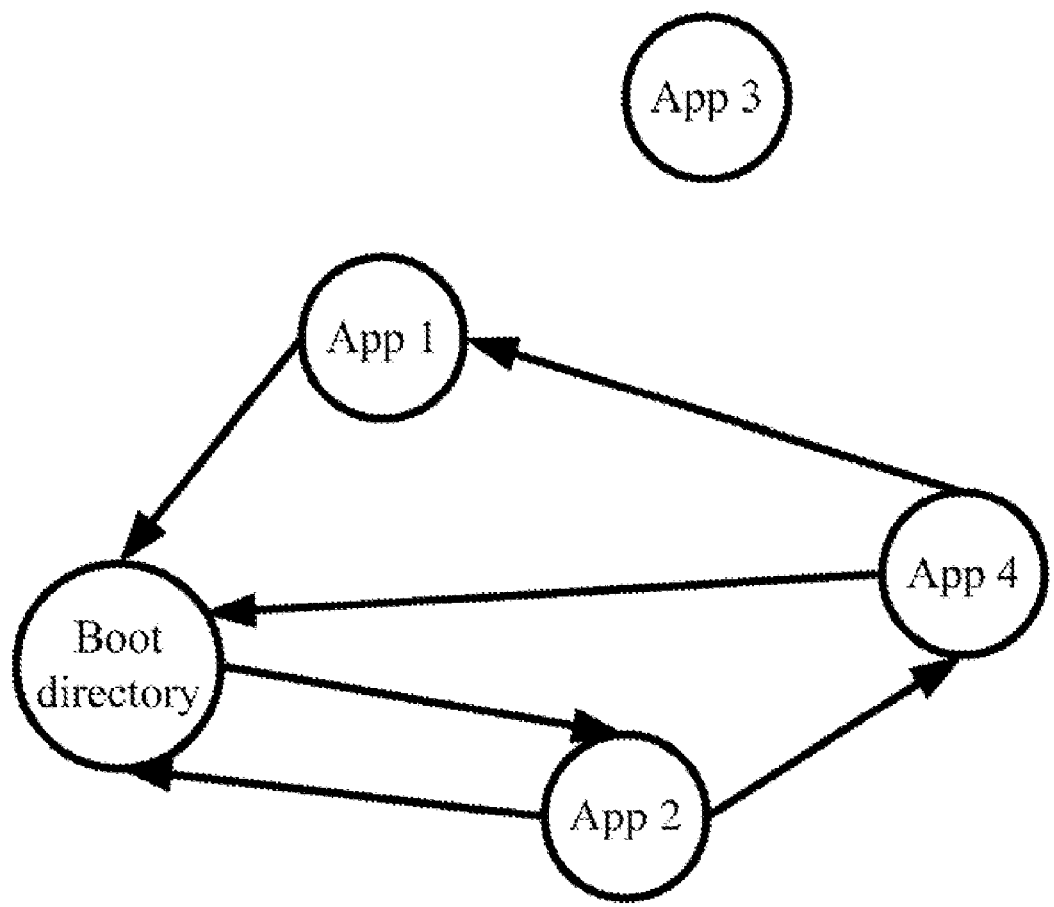

FIG. 3 and FIG. 4 illustrate two examples of a constructed first dependency relation graph. In one embodiment, there are six browsing paths stored in the storage device 4 equal to or more than the dependency rule. The six browsing paths include the browsing path to "App 2" from "Boot directory," the browsing path to "Boot directory" from "App 2," the browsing path to "Boot directory" from "App 4," the browsing path to "App 4" from "App 2," the browsing path to "App 1" from "App 4," and the browsing path to "Boot directory" from "App 1." Thus, it can be seen that, in FIG. 3 and FIG. 4, nodes "App 1," "App 4," and "App 2" are connected to a node "Boot directory," the node "Boot directory" is connected to the node "App 2," the node "App 2" is connected to "App 4," and the node "App 4" is connected to the node "App 1." In addition, in the embodiment, another browsing path to "App 3" from "Boot directory" exits in the storage device 4, but is less than the dependency rule. Thus, a node "App 3" is placed in the first dependency relation graphs of FIG. 3 and FIG. 4, but is not connected to any node.

Figure 6:
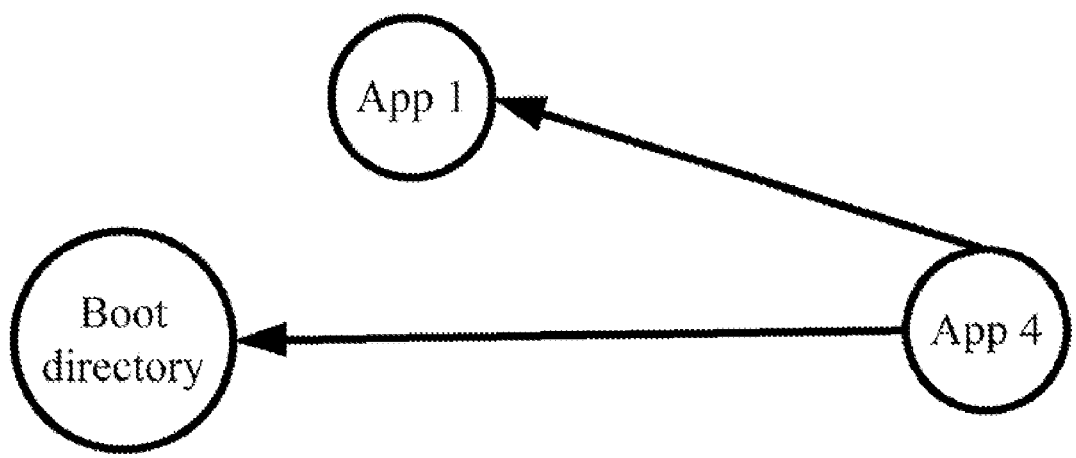
FIG. 6 illustrates an example of a second dependency relation graph.

In addition, the dependency relation graph constructing module 15 is also operable to construct a second dependency relation graph for the currently invoked application. In one embodiment, the second dependency relation graph only shows the browsing paths which are from the currently invoked application and whose counts are equal to or more than the dependency rule. Assuming that "App 4" is the currently invoked application, FIG. 6 is an example illustrating a constructed second dependency relation graph for the currently invoked application "App 4."

Figure 5:
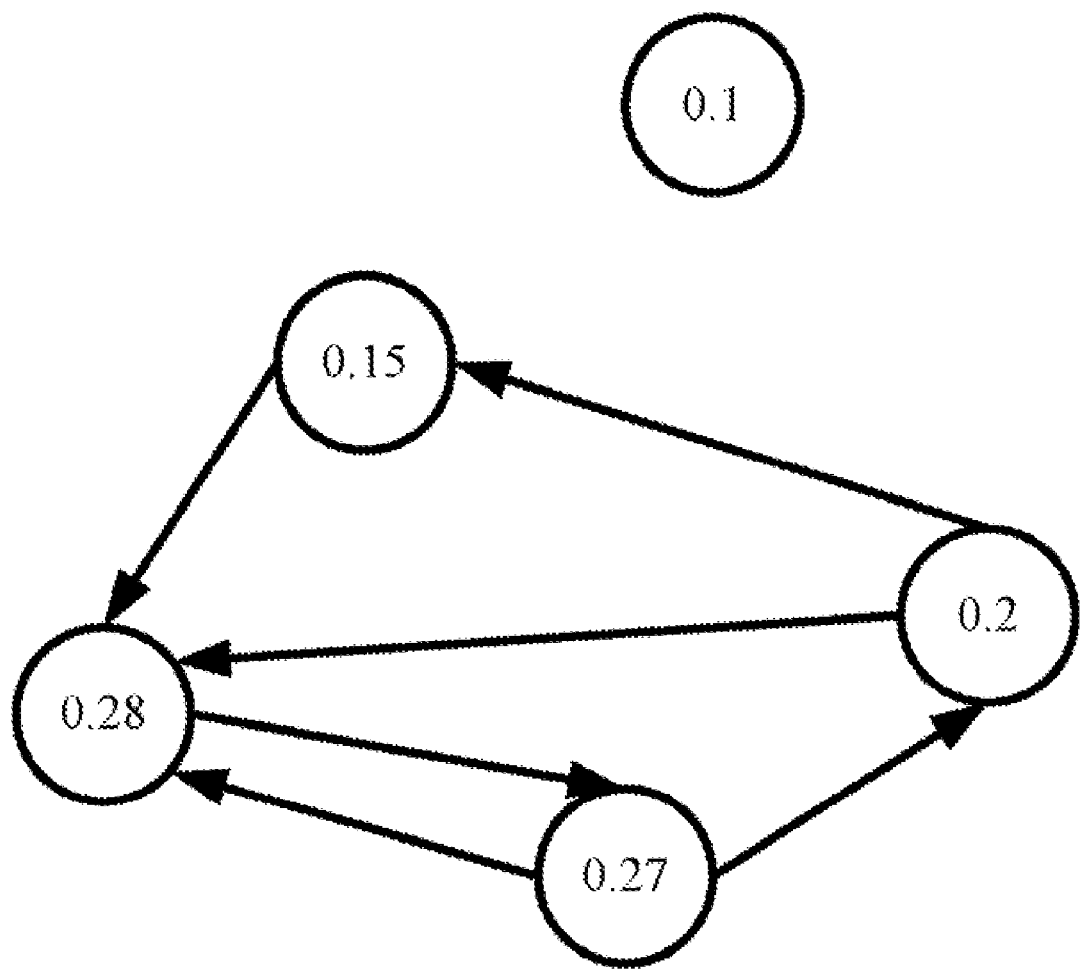
FIG. 5 illustrates an example of weight values of nodes of the dependency relation graph in FIG. 4.

The weight value computing module 16 is operable to compute a weight value of each node in the first or second dependency relation graph. FIG. 5 illustrates an example of weight values of nodes of the first dependency relation graph in FIG. 4. It may be understood that, a sum of the weight values is 1. In one embodiment, the weight value computing module 16 computes a weight value $PR(P_i)$ of a node $P_i$ using the PageRank algorithm. One embodiment of the PageRank algorithm is illustrated in FIG. 8. In the formula illustrated in FIG. 8, "$P_1$", "$P_2$", "$P_j$" arc nodes connected to the node $P_i$. For example, in FIG. 4, "App 1" "App 4" and "App 2" are nodes connected to the node "Boot directory." $PR(p_j)$ means a weight value of the node "$P_j$". "$Outdegree(P_j)$" indicates a count of nodes that the node "$P_j$" is connected to. For example, in FIG. 4, the node "App 4" is connected to the "App 1" and "Boot directory," thus, a count of nodes, which the node "App 4" is connected to, is 2. "d" is a probability value, which may be 0.15 for example. "n" is a count of nodes in the first dependency relation graph. In FIG. 4, for example, n is 5.

The ranking module 17 is operable to rank applications of the first or second dependency relation graph according to the weight values. In one embodiment, the applications are ranked in a descending order according to the weight values.

The displaying module 18 is operable to display application shortcut icons of the applications according to the rank on the display screen 5 of the electronic device 100.

Figure 7:
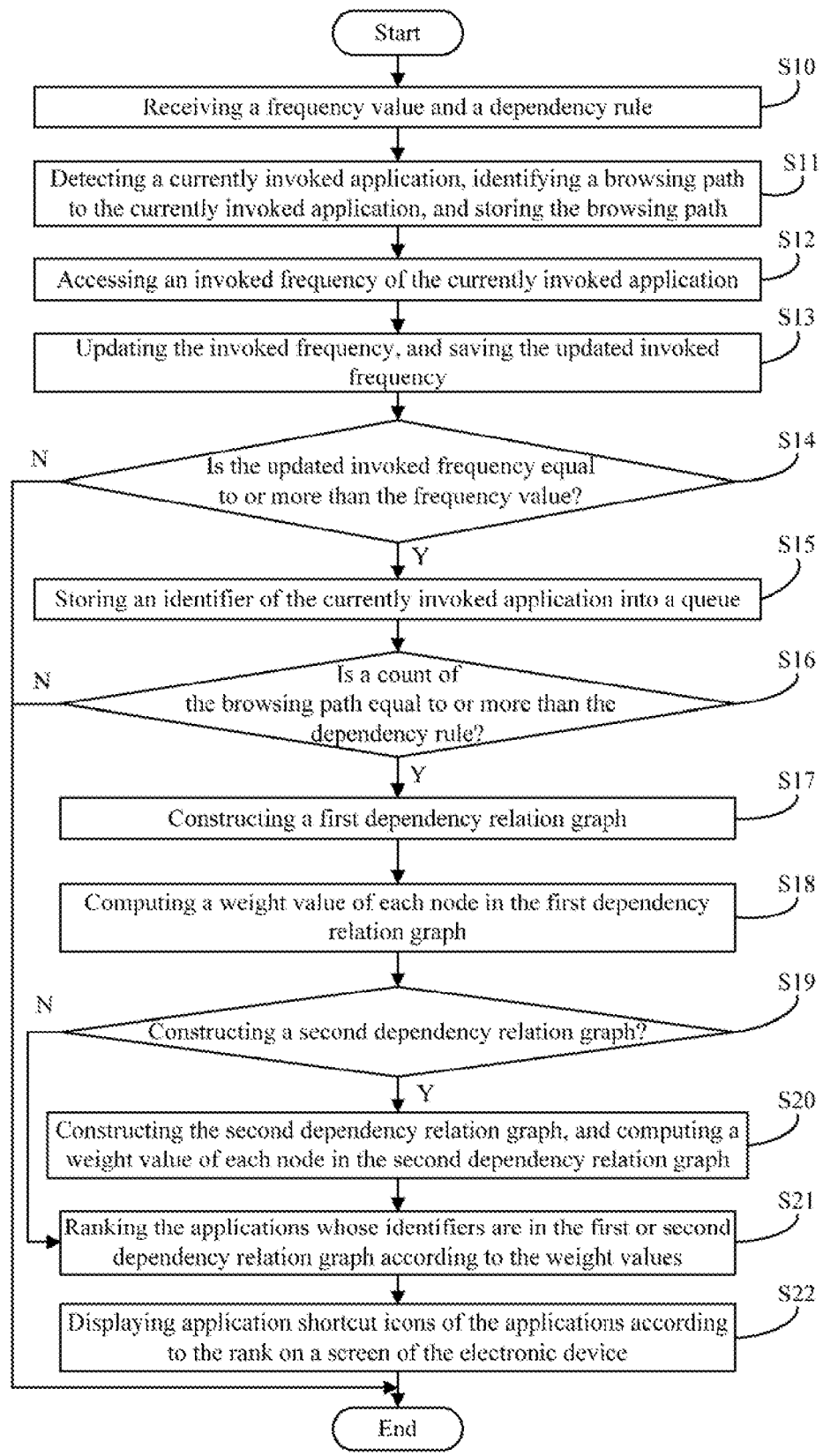
FIG. 7 is a flowchart illustrating one embodiment of a method for dynamically displaying application shortcut icons of an electronic device.

FIG. 7 is a flowchart illustrating one embodiment of a method for dynamically displaying application shortcut icons of the electronic device 100. Depending on the embodiment, additional blocks in the flow of FIG. 7 may be added, others removed, and the ordering of the blocks may be changed.

In block S10, the parameter receiving module 10 receives a predetermined frequency value and a dependency rule. In one embodiment, the frequency value and the dependency rule may be inputted by a user. As mentioned above, the frequency value is a count that how many times an application has been invoked within a predetermined time interval. The dependency rule is a count of a browsing path to an application taken.

In block S11, the detecting module 11 detects an application currently invoked by the electronic device 100, identifies a browsing path to the currently invoked application, and stores the browsing path into the storage device 4.

In block S12, the frequency computing module 12 access an invoked frequency of the currently invoked application from the storage device 4.

In block S13, the frequency computing module 12 updates the invoked frequency, and saves the updated invoked frequency in the storage device 4. In one embodiment, the frequency computing module 12 updates an invoked frequency of an application by increasing 1 after every time the application is invoked.

In block S14, the determining module 13 determines whether the updated invoked frequency of the currently invoked application is equal to or more than the predetermined frequency value. The flow goes to block S15 if the updated invoked frequency is equal to or more than the predetermined frequency value. Otherwise, the flow ends if the updated invoked frequency is less than the predetermined frequency value.

In block S15, the storing module 14 stores an identifier of the currently invoked application into a queue of the storage device 4. In one embodiment, the queue stores identifiers of all the applications frequently used by the user.

In block S16, the determining module 13 further determines whether the count of the browsing path to the currently invoked application equal to or more than the dependency rule. The flow goes to block S17, if the count of the browsing path to the current application is equal to or more than the dependency rule. Otherwise, the flow ends, if the count of the browsing path to the current application is less than the dependency rule.

In block S17, the dependency relation graph constructing module 15 constructs a first dependency relation graph for the applications whose identifiers are in the queue. The first dependency relation graph is a figurative expression of the browsing paths whose count of being taken is equal to or more than the dependency rule.

In block S18, the weight value computing module 16 computes a weight value of each node in the first dependency relation graph. As mentioned above, in one embodiment, the weight value computing module 16 computes the weight value using the PageRank algorithm.

In block S19, the dependency relation graph constructing module 15 determines whether to construct a second dependency relation graph for the currently invoked application. In an embodiment, the determination of whether to construct a second dependency relation graph is made by the user. The second dependency relation graph is a figurative expression of the browsing paths which are only from the currently invoked application. If constructing a second dependency relation graph, the flow goes to block S20. Otherwise, if not constructing a second dependency relation graph, the flow goes to block S21 described below.

In block S20, the dependency relation graph constructing module 15 further constructs a second dependency relation graph for the currently invoked application, and the weight value computing module 16 computes a weight value of each node in the second dependency relation graph.

In block S21, the ranking module 17 ranks applications of the first or second dependency relation graph according to the weight values. In one embodiment, the applications are ranked in a descending order according to the weight values.

In block S22, the displaying module 18 displays application shortcut icons of the applications according to the rank on the display screen 5 of the electronic device 100.

It may be understood that, the applications of the first or second dependency relation graph and the weight values of each node of the first or second dependency relation graph may be updated according to the operations to the applications, thus, the application shortcut icons are automatically displayed on the screen of the electronic device 100.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for dynamically displaying application shortcut icons of an electronic device, the electronic device comprising a storage device storing applications, the method comprising:
    (a) receiving a predetermined frequency value and a dependency rule, wherein the frequency value is a count that how many times an application has been invoked within a predetermined time interval and the dependency rule is a count of a taken browsing path to the application;
    (b) detecting a currently invoked application, and identifying a browsing path to the currently invoked application, and storing the browsing path into the storage device;
    (c) accessing an invoked frequency of the currently invoked application from the storage device;
    (d) updating the invoked frequency, and saving the updated invoked frequency in the storage device;
    (e) storing an identifier of the currently invoked application into a queue of the storage device upon the condition that the updated invoked frequency of the currently invoked application is equal to or more than the predetermined frequency value;
    (f) constructing a first dependency relation graph for the applications whose identifiers are in the queue upon the condition that the count of the browsing path to the currently invoked application is equal to or more than the dependency rule;
    (g) computing a weight value of each node in the first dependency relation graph using the algorithm:

$$PR(P_i) = \frac{(d)}{n} + (1-d) \times \sum_{l_{j,i} \in E} PR(P_j)/\text{Out degree}(P_j)$$
$$= \frac{(d)}{n} + (1-d) \times \left\{ \frac{PR(P_1)}{\text{Out degree}(P_1)} + \frac{PR(P_2)}{\text{Out degree}(P_2)} + \ldots + \frac{PR(P_j)}{\text{Out degree}(P_j)} \right\},$$

wherein, "$P_1$", "$P_2$", . . . "$P_j$" are nodes of the first dependency relation graph that are connected to a node $P_i$ of the first dependency relation graph, $PR(P_j)$ is a weight value of the node "$P_j$" of the first dependency relation graph, "Outdegree($P_j$)" is a count of nodes of the first dependency relation graph that the node "$P_j$" is connected to, and "n" is a count of nodes in the first dependency relation graph;
    (h) ranking the applications of the first dependency relation graph according to the weight values; and
    (i) displaying application shortcut icons of the applications according to the rank on a display screen of the electronic device.

2. The method as described in claim 1, wherein the invoked frequency is updated by incrementing a value of the invoked frequency by one.

3. The method as described in claim 1, further comprising:
    constructing a second dependency relation graph according to the browsing paths which are only from the currently invoked application and whose count are equal to or more than the predetermined frequency value; and
    computing a weight value of each node in the second dependency relation graph.

4. The method as described in claim 1, wherein in block (h) the applications are ranked in a descending order according to the weight values.

5. The method as described in claim 1, the electronic device is a mobile phone, a computer, or a personal digital assistant.

6. A storage device medium having stored thereon instructions that, when executed by a processor, causing the processor to perform a method for dynamically displaying application shortcut icons of an electronic device, the electronic device comprising a storage device storing applications, wherein the method comprises:
    (a) receiving a predetermined frequency value and a dependency rule, wherein the frequency value is a count that how many times an application has been invoked within a predetermined time interval and the dependency rule is a count of a taken browsing path to the application;
    (b) detecting a currently invoked application, and identifying a browsing path to the currently invoked application, and storing the browsing path into the storage device;
    (c) accessing an invoked frequency of the currently invoked application from the storage device;
    (d) updating the invoked frequency, and saving the updated invoked frequency in the storage device;
    (e) storing an identifier of currently invoked application into a queue of the storage device upon the condition that the updated invoked frequency of the currently invoked application is equal to or more than the predetermined frequency value;
    (f) constructing a first dependency relation graph for the applications whose identifiers are in the queue upon the condition that the count of the browsing path to the current application is equal to or more than the dependency rule;

(g) computing a weight value of each node in the first dependency relation graph using the algorithm:

$$PR(P_i) = \frac{(d)}{n} + (1-d) \times \sum_{l_{j,i} \in E} PR(P_j) / \text{Out degree}(P_j)$$

$$= \frac{(d)}{n} + (1-d) \times \left\{ \frac{PR(P_1)}{\text{Out degree}(P_1)} + \frac{PR(P_2)}{\text{Out degree}(P_2)} + \ldots + \frac{PR(P_j)}{\text{Out degree}(P_j)} \right\},$$

wherein "$P_1$", "$P_2$", ... "$P_j$" are nodes of the first dependency relation graph that are connected to a node $P_i$ of the first dependency relation graph, $PR(P_j)$ is a weight value of the node "$P_j$" of the first dependency relation graph "Outdegree($P_j$)" is a count of nodes of the first dependency relation graph that the node "$P_j$" is connected to, and "n" is a count of nodes in the first dependency relation graph;

(h) ranking the applications of the first dependency relation graph according to the weight values; and (i) displaying application shortcut icons of the applications according to the rank on a display screen of the electronic device.

7. The storage device medium as described in claim 6, wherein the invoked frequency is updated by incrementing a value of the invoked frequency by one.

8. The storage device medium as described in claim 6, further comprising:

constructing a second dependency relation graph according to the browsing paths which are only from the currently invoked application and whose count are equal to or more than the predetermined frequency value; and computing a weight value of each node in the second dependency relation graph.

9. The storage device medium as described in claim 6, wherein in block (h) the applications are ranked in a descending order according to the weight values.

10. The storage device medium as described in claim 6, wherein the electronic device is a mobile phone, a computer, or a personal digital assistant.

11. A system for dynamically displaying application shortcut icons of an electronic device, the electronic device being installed with applications, the system comprising:

a storage device;

a parameter receiving module operable to receive a predetermined frequency value and a dependency rule, wherein the frequency value is a count that how many times an application has been invoked within a predetermined time interval and the dependency rule is a count of a taken browsing path to the application;

a detecting module operable to detect a currently invoked application, and identify a browsing path to the currently invoked application, and store the browsing path into the storage device;

a frequency computing module operable to access an invoked frequency of the currently invoked application from the storage device, update the invoked frequency, and save the updated invoked frequency in the storage device;

a storing module operable to store an identifier of the currently invoked application into a queue of the storage device, upon the condition that the updated invoked frequency of the currently invoked application equals or is more than the predetermined frequency value;

a dependency relation graph constructing module operable to construct a first dependency relation graph for the applications whose identifiers are in the queue upon the condition that the count of the browsing path to the current application is equal to or more than the dependency rule;

a weight value computing module operable to compute a weight value of each node in the first dependency relation graph using the algorithm:

$$PR(P_i) = \frac{(d)}{n} + (1-d) \times \sum_{l_{j,i} \in E} PR(P_j) / \text{Out degree}(P_j)$$

$$= \frac{(d)}{n} + (1-d) \times \left\{ \frac{PR(P_1)}{\text{Out degree}(P_1)} + \frac{PR(P_2)}{\text{Out degree}(P_2)} + \ldots + \frac{PR(P_j)}{\text{Out degree}(P_j)} \right\},$$

wherein, "$P_1$", "$P_2$", ... "$P_j$" are nodes of the first dependency relation graph that are connected to a node $P_i$ of the first dependency relation graph, $PR(P_j)$ is a weight value of the node "$P_j$" of the first dependency relation graph, "Outdegree($P_j$)" is a count of nodes of the first dependency relation graph that the node "$P_j$" is connected to and "n" is a count of nodes in the first dependency relation graph;

a ranking module operable to rank the applications of the first dependency relation graph according to the weight values; and a displaying module operable to displays application shortcut icons of the applications according to the rank on a display screen of the electronic device.

12. The system as described in claim 11, wherein the frequency computing module updates the invoked frequency by incrementing a value of the invoked frequency by one.

13. The system as described in claim 11, wherein the dependency relation graph constructing module is further operable to construct a second dependency relation graph according to the browsing paths which are only from the currently invoked application and whose count are equal to or more than the predetermined frequency value.

14. The system as described in claim 13, wherein the weight value computing module is further operable to compute a weight value of each node in the second dependency relation graph.

15. The system as described in claim 11, wherein the ranking module ranks the applications in a descending order according to the weight values.

16. The system as described in claim 11, wherein the electronic device is a mobile phone, a computer, or a personal digital assistant.

17. The system as described in claim 11, wherein the storage device is a hard disk drive, a compact disk drive, or a floppy disk drive.

\* \* \* \* \*